United States Patent
Franciosi et al.

(10) Patent No.: US 10,613,890 B2
(45) Date of Patent: Apr. 7, 2020

(54) EFFICIENT I/O REQUEST HANDLING

(71) Applicant: Nutanix, Inc., San Jose, CA (US)

(72) Inventors: Felipe Franciosi, Cambridge (GB);
Malcolm Crossley, Cambridge (GB);
Miao Cui, New York, NY (US)

(73) Assignee: NUTANIX, INC., San Jose, CA (US)

( * ) Notice: Subject to any disclaimer, the term of this patent is extended or adjusted under 35 U.S.C. 154(b) by 61 days.

(21) Appl. No.: 15/835,753

(22) Filed: Dec. 8, 2017

(65) Prior Publication Data

US 2018/0165116 A1 Jun. 14, 2018

Related U.S. Application Data

(60) Provisional application No. 62/432,113, filed on Dec. 9, 2016.

(51) Int. Cl.
*G06F 9/455* (2018.01)
*G06F 13/14* (2006.01)
*H04L 29/08* (2006.01)

(52) U.S. Cl.
CPC .......... *G06F 9/45558* (2013.01); *G06F 13/14* (2013.01); *H04L 67/00* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2010/0306773 A1* | 12/2010 | Lee | G06F 9/5077 718/1 |
| 2011/0153810 A1* | 6/2011 | Raja | H04L 67/1029 709/224 |
| 2017/0364290 A1* | 12/2017 | Bhardwaj | G06F 3/0619 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Kenneth Tang
(74) *Attorney, Agent, or Firm* — Foley & Lardner LLP

(57) ABSTRACT

A method of efficient message transmission includes a hypervisor receiving a first input/output (I/O) request from a ring buffer; receiving a second I/O request from the ring buffer; receiving an absence of further I/O requests from the ring buffer; comparing an aggregate size of a first message and the second I/O request to a maximum transmission unit, wherein the first message comprises the first I/O request and a first protocol overhead; generating a combined message, in response to the aggregate size of the first message and the second I/O request being less than the maximum transmission unit. The combined message comprises the first I/O request, the second I/O request, and the first protocol overhead; and forwarding the combined message to an I/O target.

24 Claims, 3 Drawing Sheets

(56) References Cited

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

EFFICIENT I/O REQUEST HANDLING

CROSS-REFERENCE TO RELATED PATENT APPLICATIONS

This application claims priority from Provisional application U.S. Application 62/432,113, filed Dec. 9, 2016, incorporated herein by reference in its entirety. U.S. Pat. No. 8,601,473 filed on Aug. 10, 2011 is herein incorporated by reference in its entirety.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY

Aspects of the present disclosure relate generally to a virtualization environment, and more particularly to a method of efficient input/output (I/O) request handling.

One embodiment relates to a method comprising receiving, by a hypervisor, a first I/O request from a ring buffer; receiving, by the hypervisor, a second I/O request from the ring buffer; receiving, by the hypervisor, an absence of further I/O requests from the ring buffer within a pre-determined amount of time from a receipt of the second I/O request; and comparing, by the hypervisor, an aggregate size of a first message and the second I/O request to a maximum transmission unit. The first message comprises a first payload and a first protocol overhead, and the first payload comprises the first I/O request. The first message can be characterized by a first network bandwidth consumption. The method further includes generating, by the hypervisor, a combined message, in response to the aggregate size of the first message and the second I/O request being less than the maximum transmission unit. The combined message comprises a combined payload and the first protocol overhead. The combined payload comprises the first I/O request and the second I/O request. The combined message can be characterized by a combined network bandwidth consumption that is less than a sum of the first network bandwidth consumption and a second bandwidth consumption corresponding to a second message comprising a second payload and a second protocol overhead. The second payload comprises the second I/O request. The method also includes forwarding, by the hypervisor, the combined message to an I/O target.

Another embodiment relates to a system comprising a plurality of user virtual machines; an I/O target; a controller virtual machine configured to manage access by the user virtual machines to the I/O target; a ring buffer configured to receive a first I/O request and a second I/O request from the controller virtual machine; and a hypervisor configured to receive the first I/O request from the ring buffer; receive the second I/O request from the ring buffer; receive an absence of further I/O requests from the ring buffer within a pre-determined amount of time from a receipt of the second I/O request; and compare an aggregate size of a first message and the second I/O request to a maximum transmission unit. The first message comprises a first payload and a first protocol overhead. The first payload comprises the first I/O request, and the first message can be characterized by a first network bandwidth consumption; generate a combined message, in response to the aggregate size of the first message and the second I/O request being less than the maximum transmission unit. The combined message comprises a combined payload and the first protocol overhead. The combined payload comprises the first I/O request and the second I/O request. The combined message can be characterized by a combined network bandwidth consumption that is less than a sum of the first network bandwidth consumption and a second bandwidth consumption corresponding to a second message comprising a second payload and a second protocol overhead. The second payload comprises the second I/O request. The hypervisor forwards the combined message to the I/O target.

Another embodiment relates to a non-transitory computer-readable storage medium having instructions stored thereon that, upon execution by a computing device, causes the computing device to perform operations comprising receiving, by a hypervisor, a first I/O request from a ring buffer; receiving, by the hypervisor, a second I/O request from the ring buffer; receiving, by the hypervisor, an absence of further I/O requests from the ring buffer within a pre-determined amount of time from a receipt of the second I/O request; and comparing, by the hypervisor, an aggregate size of a first message and the second I/O request to a maximum transmission unit. The first message comprises a first payload and a first protocol overhead. The first payload comprises the first I/O request, and the first message can be characterized by a first network bandwidth consumption. The operations also include generating, by the hypervisor, a combined message, in response to the aggregate size of the first message and the second I/O request being less than the maximum transmission unit, wherein the combined message comprises a combined payload and the first protocol overhead. The combined payload comprises the first I/O request and the second I/O request. The combined message can be characterized by a combined network bandwidth consumption that is less than a sum of the first network bandwidth consumption and a second bandwidth consumption corresponding to a second message comprising a second payload and a second protocol overhead. The second payload comprises the second I/O request. The operations include forwarding, by the hypervisor, the combined message to an I/O target.

DETAILED DESCRIPTION

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Figure 1A:
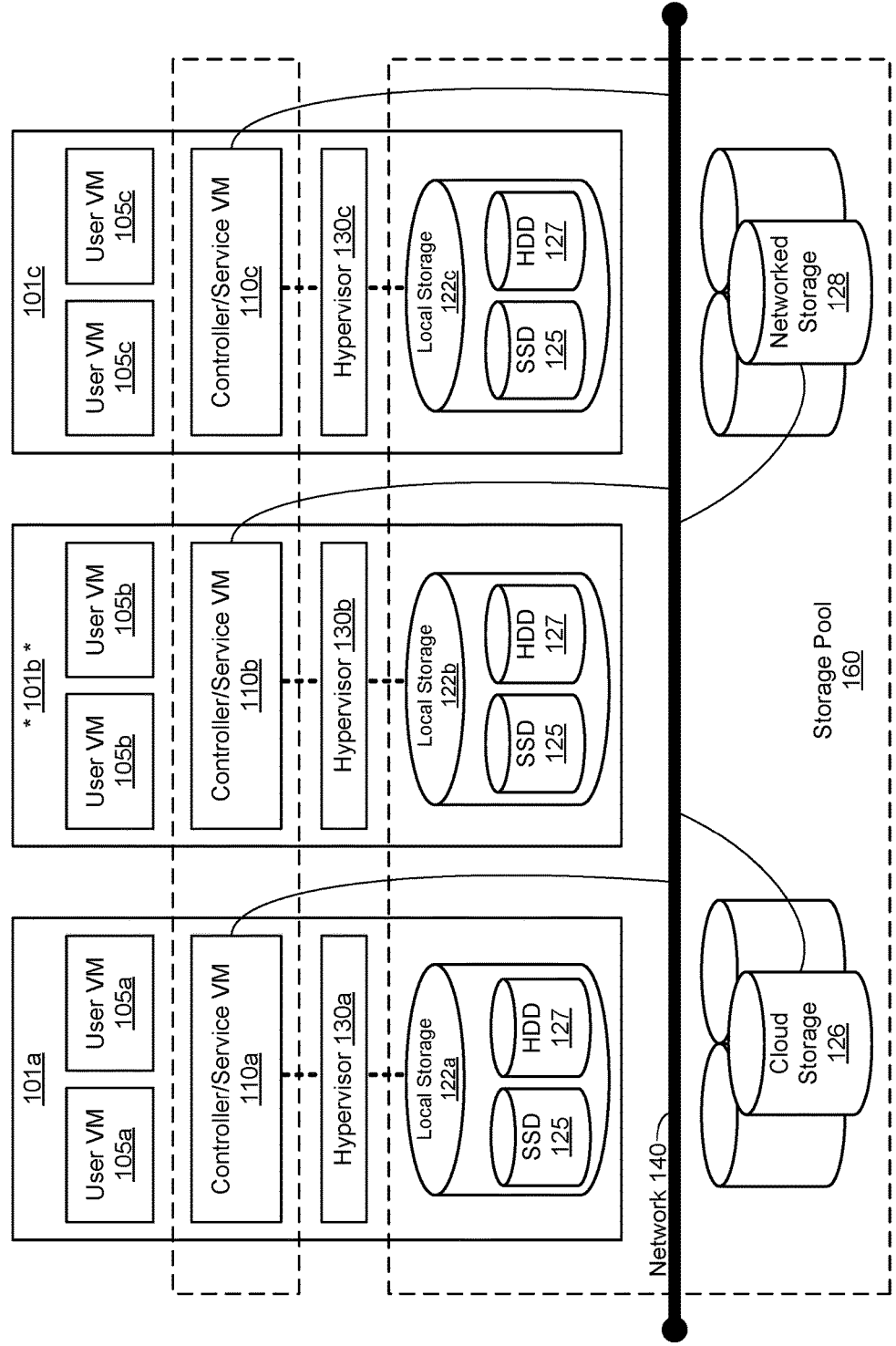
FIG. 1A illustrates a clustered virtualization environment.

FIG. 1A illustrates a clustered virtualization environment 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101a-c may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
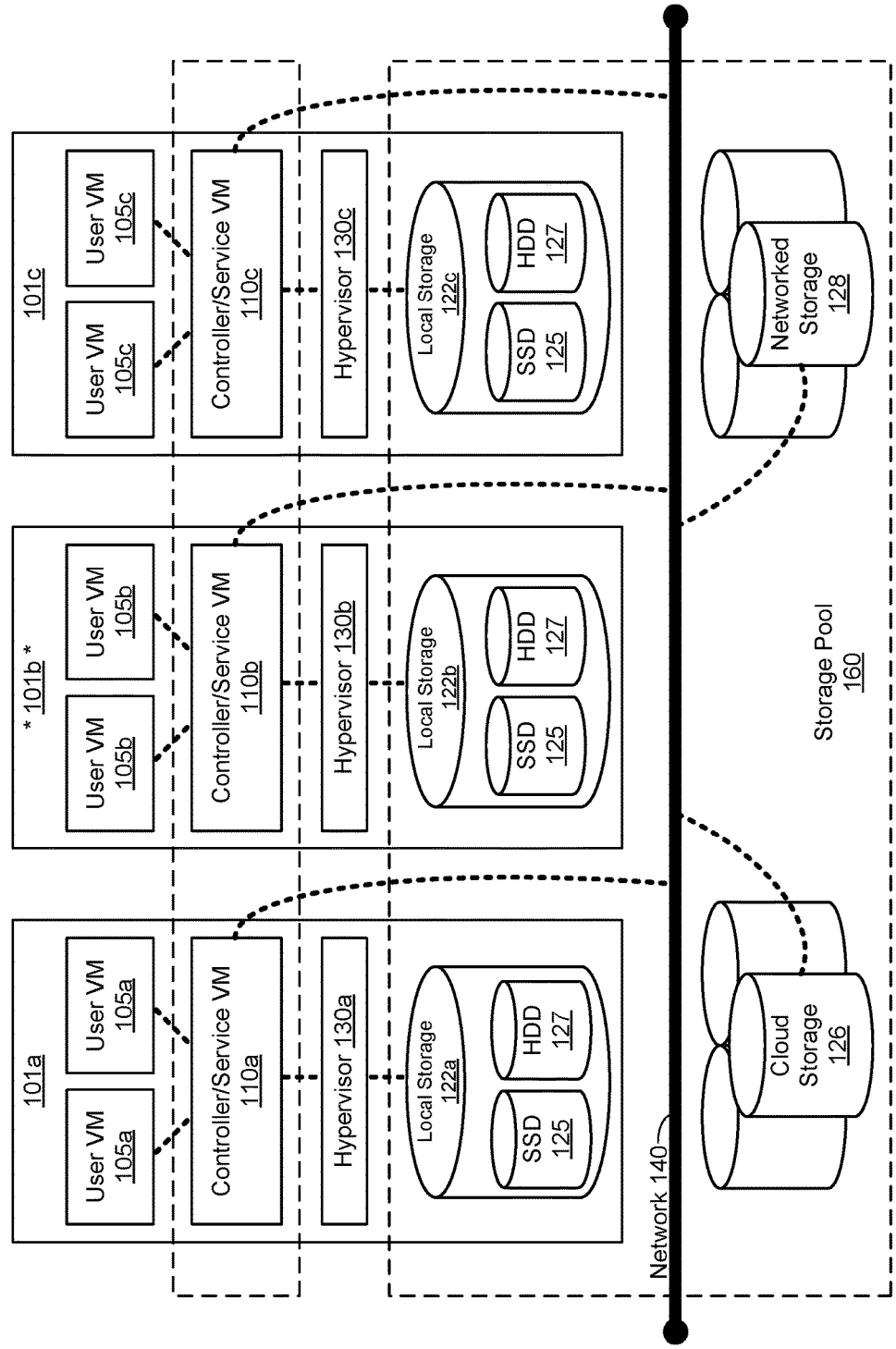
FIG. 1B illustrates data flow within a clustered virtualization environment.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 200 may be used to implement a host machine 101.

I/O requests may be generated by guest operating systems running on user VMs 105a on host machine 101a. User VMs 105a may send the I/O requests to CVM 110a, which writes the I/O requests to a shared ring buffer, from which hypervisor 130a may retrieve the I/O requests. Hypervisor 130a then forwards each I/O request to the correct I/O target (e.g., via a TCP socket). Particular embodiments of hypervisor may aggregate multiple I/O requests intended for a single I/O target before forwarding the aggregated requests in a single aggregated message. Although the total payload for the messages remains the same whether aggregated or unaggregated, by reducing the overall number of messages transmitted to an I/O target, particular embodiments may reduce network bandwidth consumption due to protocol overhead (e.g., metadata and network routing information sent with each message sent over a network), as well as consumption of computing cycles due to the overhead involved in each additional socket operation.

Particular embodiments may aggregate requests up to a maximum size for the aggregated data; in some embodiments, the maximum size may correspond to the maximum transmission unit (MTU) of the communications protocol. In particular embodiments, requests may be aggregated based upon a priori information obtained from the ring buffer if the cost to read I/O requests from the ring buffer is less than simply forwarding the request.

Particular embodiments may read the current I/O request from the buffer and check if the current I/O request is the most recent I/O request submitted by the CVM; if so, then a flag may be set to indicate that there are no more I/O requests waiting to be processed. Hypervisor 130 may then send the I/O request and the I/O request pending state to an aggregation engine. The aggregation engine may then check the size of the I/O request size before adding the I/O request to the aggregated message. If adding the I/O request to the aggregated message would exceed the maximum size, then particular embodiments may save the I/O request to be added to the next aggregated message and forward the aggregated message to the I/O target. If addition of the I/O request to the aggregated message would not cause it to exceed the maximum size, then the I/O request is added to the aggregated message. If the flag indicates that there are no more I/O requests pending in the ring buffer, particular embodiments may forward the aggregated message to the I/O target.

In particular embodiments, if the overhead for reading I/O requests from the ring buffer is low, particular embodiments may achieve a reduction in socket and protocol overhead while causing trivial delay of the first I/O request in the aggregated message. Particular embodiments may limit aggregation of I/O requests to read requests (thereby forwarding write requests individually). Particular embodiments may aggregate both read requests and write requests. In particular embodiments, all I/O requests are handled serially; in particular embodiments, the aggregated messages may be handled in parallel, using two or more sockets or multipath TCP.

Figure 2:
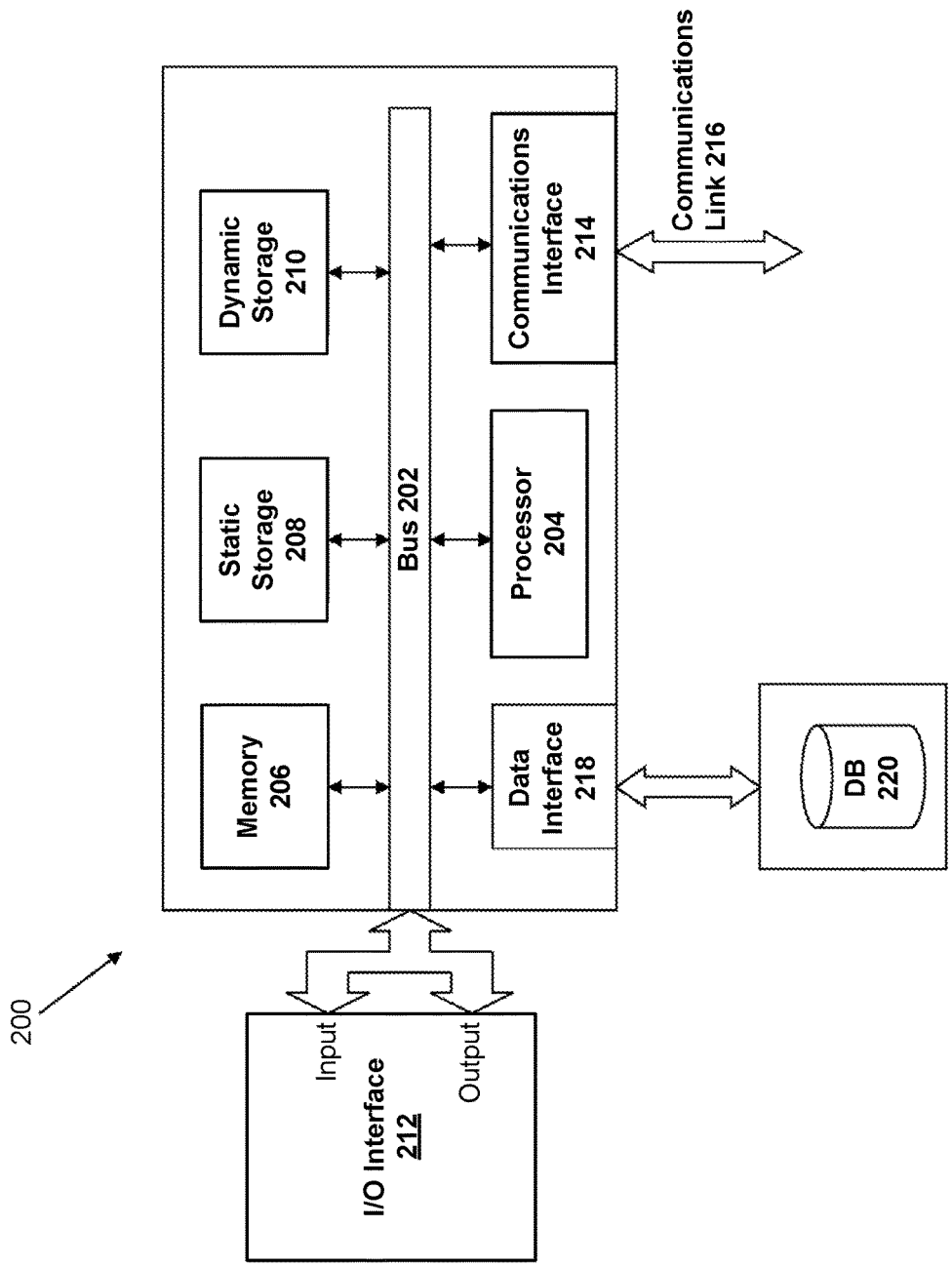
FIG. 2 illustrates a block diagram of a computing system suitable for implementing particular embodiments disclosed herein.

FIG. 2 is a block diagram of an illustrative computing system 200 suitable for implementing particular embodiments. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

Computer system 200 includes a bus 202 (e.g., an address bus and a data bus) or other communication mechanism for communicating information, which interconnects subsystems and devices, such as processor 204, memory 206 (e.g., RAM), static storage 208 (e.g., ROM), dynamic storage 210 (e.g., magnetic or optical), communication interface 214 (e.g., modem, Ethernet card, a network interface controller (MC) or network adapter for communicating with an Ethernet or other wire-based network, a wireless NIC (WNIC) or wireless adapter for communicating with a wireless network, such as a WI-FI network), input/output (I/O) interface 212 (e.g., keyboard, keypad, mouse, microphone). In particular embodiments, computer system 200 may include one or more of any such components.

In particular embodiments, processor 204 includes hardware for executing instructions, such as those making up a computer program. As an example and not by way of limitation, to execute instructions, processor 204 may retrieve (or fetch) the instructions from an internal register, an internal cache, memory 206, static storage 208, or dynamic storage 210; decode and execute them; and then write one or more results to an internal register, an internal cache, memory 206, static storage 208, or dynamic storage 210. In particular embodiments, processor 204 may include one or more internal caches for data, instructions, or addresses. This disclosure contemplates processor 204 including any suitable number of any suitable internal caches, where appropriate. As an example and not by way of limitation, processor 204 may include one or more instruction caches, one or more data caches, and one or more translation lookaside buffers (TLBs). Instructions in the instruction caches may be copies of instructions in memory 206, static storage 208, or dynamic storage 210, and the instruction caches may speed up retrieval of those instructions by processor 204. Data in the data caches may be copies of data in memory 206, static storage 208, or dynamic storage 210 for instructions executing at processor 204 to operate on; the results of previous instructions executed at processor 204 for access by subsequent instructions executing at processor 204 or for writing to memory 206, static storage 208, or dynamic storage 210; or other suitable data. The data caches may speed up read or write operations by processor 204. The TLBs may speed up virtual-address translation for processor 204. In particular embodiments, processor 204 may include one or more internal registers for data, instructions, or addresses. This disclosure contemplates processor 204 including any suitable number of any suitable internal registers, where appropriate. Where appropriate, processor 204 may include one or more arithmetic logic units (ALUs); be a multi-core processor; or include one or more processors 202. Although this disclosure describes and illustrates a particular processor, this disclosure contemplates any suitable processor.

In particular embodiments, I/O interface 212 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 212 for them. Where appropriate, I/O interface 212 may include one or more device or software drivers enabling processor 204 to drive one or more of these I/O devices. I/O interface 212 may include one or more I/O interfaces 212, where appropriate. Although this disclosure describes and illustrates a particular I/O interface, this disclosure contemplates any suitable I/O interface.

In particular embodiments, communication interface 214 includes hardware, software, or both providing one or more interfaces for communication (such as, for example, packet-based communication) between computer system 200 and one or more other computer systems 200 or one or more networks. As an example and not by way of limitation, communication interface 214 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 214 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 214 for any of these networks, where appropriate. Communication interface 214 may include one or more communication interfaces 214, where appropriate. Although this disclosure describes and illustrates a particular communication interface, this disclosure contemplates any suitable communication interface.

One or more memory buses (which may each include an address bus and a data bus) may couple processor 204 to memory 206. Bus 202 may include one or more memory buses, as described below. In particular embodiments, one or more memory management units (MMUs) reside between processor 204 and memory 206 and facilitate accesses to memory 206 requested by processor 204. In particular embodiments, memory 206 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 206 may include one or more memories 206, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 210 may include a hard disk drive (HDD), a floppy disk drive, flash memory, an optical disc, a magneto-optical disc, magnetic tape, or a Universal Serial Bus (USB) drive or a combination of two or more of these. Dynamic storage 210 may include removable or non-removable (or fixed) media, where appropriate. Dynamic storage 210 may be internal or external to computer system 200, where appropriate. This disclosure contemplates mass dynamic storage 210 taking any suitable physical form. Dynamic storage 210 may include one or more storage control units facilitating communication between processor 204 and dynamic storage 210, where appropriate.

In particular embodiments, bus 202 includes hardware, software, or both coupling components of computer system 200 to each other. As an example and not by way of limitation, bus 202 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFIMBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 202 may include one or more buses 206, where appropriate. Although this disclosure describes and illustrates a particular bus, this disclosure contemplates any suitable bus or interconnect.

According particular embodiments, computer system 200 performs specific operations by processor 204 executing one or more sequences of one or more instructions contained in memory 206. Such instructions may be read into memory 206 from another computer readable/usable medium, such as static storage 208 or dynamic storage 210. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 204 for execution. Such a medium may take many forms, including but not limited to, nonvolatile media and volatile media. Non-volatile media includes, for example, optical or magnetic disks, such as static storage 208 or dynamic storage 210. Volatile media includes dynamic memory, such as memory 206.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 200; in alternative embodiments, two or more computer systems 200 coupled by communication link 216 (e.g., LAN, PTSN, or wireless network) may perform the sequence of instructions in coordination with one another.

Computer system 200 may transmit and receive messages, data, and instructions, including program, i.e., application code, through communication link 216 and communication interface 214. Received program code may be executed by processor 204 as it is received, and/or stored in static storage 208 or dynamic storage 210, or other non-volatile storage for later execution. A database 220 may be used to store data accessible by the system 200 by way of data interface 218.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a first input/output (I/O) request and a second I/O request from a ring buffer;
   receiving an absence of further I/O requests within a pre-determined amount of time from a receipt of the second I/O request;
   generating a combined message, in response to an aggregate size of a first message and the second I/O request being less than a maximum transmission unit, wherein the combined message comprises the first message and the second I/O request, wherein the first message comprises the first I/O request and a first protocol overhead; and
   forwarding the combined message to an I/O target.

2. The method of claim 1, further comprising:
   forwarding the first message to the I/O target, in response to the aggregate size of the first message and the second I/O request being greater than the maximum transmission unit; and
   forwarding a second message to the I/O target, the second message comprising the second I/O request and a second protocol overhead.

3. The method of claim 1, wherein the absence of further I/O requests within the pre-determined amount of time from the receipt of the second I/O request is indicated by setting a flag.

4. The method of claim 1, wherein the first protocol overhead comprises a metadata group and a network routing information group.

5. The method of claim 1, further comprising:
   determining whether the first I/O request is a first read request; and
   determining whether the second I/O request is a second read request,
   wherein the combined message is generated in response to:
      the first I/O request being the first read request; and
      the second I/O request being the second read request.

6. The method of claim 2, further comprising:
   determining whether the first I/O request is a first write request; and
   determining whether the second I/O request is a second write request,
   wherein the combined message is forwarded to the I/O target in response to:
      the first I/O request being the first write request; or
      the second I/O request being the second write request.

7. The method of claim 1, wherein the combined message is sent to the I/O target via a TCP.

8. The method of claim 1, wherein the combined message is sent to the I/O target via a multipath TCP.

9. A apparatus comprising:
   a processor having programmed instructions that, upon execution, cause the processor to:
      receive a first I/O request and a second I/O request;
      receive an absence of further I/O requests within a pre-determined amount of time from a receipt of the second I/O request;
      generate a combined message, in response to an aggregate size of a first message and the second I/O request being less than a maximum transmission unit, wherein the combined message comprises and the second I/O request, wherein the first message comprises the first I/O request and a protocol overhead; and
      forward the combined message to an I/O target.

10. The apparatus of claim 9, wherein the processor further has programmed instructions that, upon execution, cause the processor to:
    forward the first message to the I/O target, in response to the aggregate size of the first message and the second I/O request being greater than the maximum transmission unit; and
    forward a second message to the I/O target, the second message comprising the second I/O request and a second protocol overhead.

11. The apparatus of claim 10, wherein the absence of further I/O requests within the pre-determined amount of time from the receipt of the second I/O request is indicated by setting a flag.

12. The apparatus of claim 9, wherein the first protocol overhead comprises a metadata group and a network routing information group.

13. The apparatus of claim 9, wherein the processor further has programmed instructions that, upon execution, cause the processor to:
    determine whether the first I/O request is a first read request; and
    determine whether the second I/O request is a second read request,
    wherein the combined message is generated in response to:
       the first I/O request being the first read request; and
       the second I/O request being the second read request.

14. The apparatus of claim 13, wherein the processor further has programmed instructions that, upon execution, cause the processor to:
    determine whether the first I/O request is a first write request; and
    determine whether the second I/O request is a second write request,
    wherein the first message is forwarded in response to:
       the first I/O request being the first write request; or
       the second I/O request being the second write request.

15. The apparatus of claim 9, wherein the combined message is sent to the I/O target via a TCP.

16. The apparatus of claim 9, wherein the combined message is sent to the I/O target via a multipath TCP.

17. A non-transitory computer-readable storage medium having instructions stored thereon that, upon execution by a computing device, causes the computing device to perform operations comprising:
    receiving a first I/O request and a second I/O request;
    receiving an absence of further I/O requests within a pre-determined amount of time from a receipt of the second I/O request;
    generating a combined message, in response to an aggregate size of a first message and the second I/O request being less than a maximum transmission unit, wherein the combined message comprises the first message and the second I/O request, wherein the first message comprises the first I/O request and a first protocol overhead; and
    forwarding the combined message to an I/O target.

18. The non-transitory computer-readable storage medium of claim 17, further comprising:
    forwarding the first message to the I/O target, in response to the aggregate size of the first message and the second I/O request being greater than the maximum transmission unit; and
    forwarding a second message to the I/O target, the second message comprising the second I/O request and a second protocol overhead.

19. The non-transitory computer-readable storage medium of claim 17, wherein the absence of further I/O requests within the pre-determined amount of time from the receipt of the second I/O request is indicated by setting a flag.

20. The non-transitory computer-readable storage medium of claim 17, wherein the first protocol overhead comprises a metadata group and a network routing information group.

21. The non-transitory computer-readable storage medium of claim 17, further comprising:
    determining whether the first I/O request is a first read request; and
    determining whether the second I/O request is a second read request,
    wherein the combined message is generated in response to:
        the first I/O request being the first read request; and
        the second I/O request being the second read request.

22. The non-transitory computer-readable storage medium of claim 17, further comprising:
    determining whether the first I/O request is a first write request; and
    determining whether the second I/O request is a second write request,
    wherein the combined message is forwarded to the I/O target in response to:
        the first I/O request being the first write request; or
        the second I/O request being the second write request.

23. The non-transitory computer-readable storage medium of claim 17, wherein the combined message is sent to the I/O target via a TCP.

24. The non-transitory computer-readable storage medium of claim 17, wherein the combined message is sent to the I/O target via a multipath TCP.

* * * * *